Oct. 7, 1958    H. J. TYLER ET AL    2,855,152
THERMOSTATICALLY CONTROLLED FLUID VALVE
Filed June 28, 1956
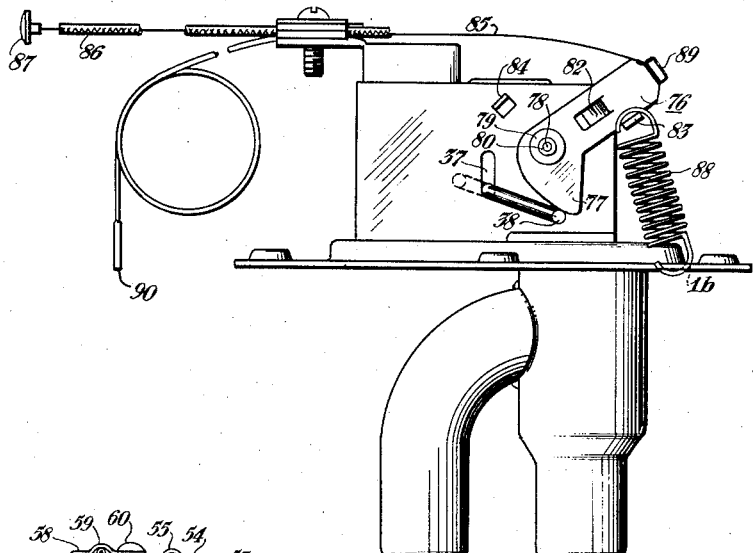
Fig. 1.
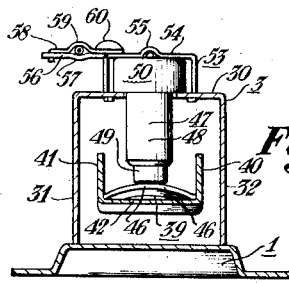
Fig. 4.
Fig. 5.
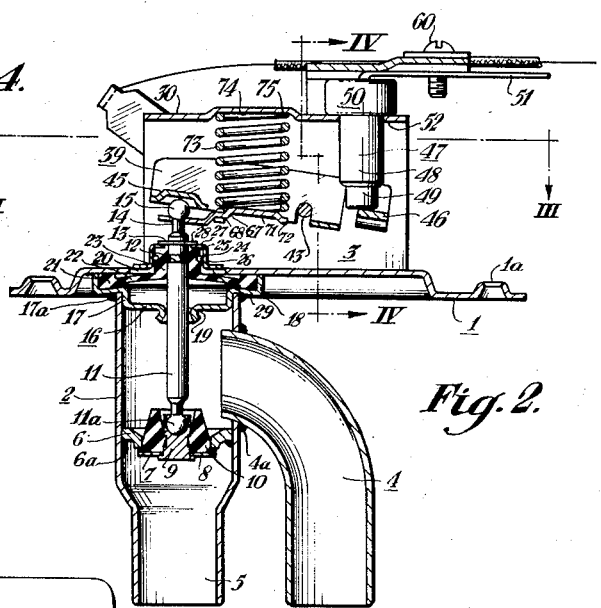
Fig. 2.
Fig. 3.
INVENTORS.
Hugh J. Tyler and
Frank V. Mingrone
BY
HIS ATTORNEY.

United States Patent Office 2,855,152
Patented Oct. 7, 1958

2,855,152

THERMOSTATICALLY CONTROLLED FLUID VALVE

Hugh J. Tyler, Jeannette, Pa., and Frank V. Mingrone, Milford, Conn., assignors to Robertshaw-Fulton Controls Company, Greensburg, Pa., a corporation of Delaware Application June 28, 1956, Serial No. 594,494

7 Claims. (Cl. 236—99)

This invention relates to thermostatically controlled fluid valves and more particularly to a thermostatically controlled water valve that is adapted to control the flow of fluid to a vehicle heater or heat exchanger in response to changes in the temperature of a medium flowing over the heat exchanger.

The almost universal method of heating present day automobiles is to funnel outside air into the passenger compartment through a heat exchanger supplied with hot fluid or hot water from the cooling system of the vehicle engine. At high and medium road speeds, an adequate supply of outside air is delivered to the heat exchanger for the passenger compartment heating while at low road speeds a fan is used to increase the supply of air.

Early vehicle heaters of this type were provided with a manually controlled water valve to regulate the flow of hot water passing to the heat exchanger and thereby control the temperature of the air entering the passenger compartment. However, in most of the modern automibile heating systems, the manually controlled heater valves have been replaced with a thermostatically controlled water valve which automatically regulates the temperature of the air entering the passenger compartment.

With the use of automatically controlled water valves in vehicle heating systems, it became necessary to provide a means for varying the operating temperature range or the heat range of the valve. To be more specific, it became necessary to provide the valve with a means for selectively varying the maximum temperature of the air supplied to the passenger compartment. The necessity of providing a means to change the heat range of the thermostaticaly controlled valve arises from the fact that the demand for heat in the passenger compartment will necessarily vary in accordance with the comfort requirements of the passengers therein and will vary in accordance with changes in the temperature of the outside atmosphere.

For example, on a relatively warm day when the atmospheric temperature is about 60° Fahrenheit, it becomes necessary to supply the heat exchanger with only a limited amount of hot water in order to elevate the temperature of the outside air to a temperature suitable for passenger compartment comfort. Accordingly, the valve member of the valve need be opened only a small portion of its total stroke to supply this limited amount of hot water. If for any reason the temperature of the air entering the passenger compartment exceeds a predetermined value, the thermostatic element associated with the valve will expand and cause the valve member to move toward the closed position and reduce the supply of hot fluid to the heat exchanger. Thus, with the valve member initially opened only a small increment of its total stroke, the air is supplied to the passenger compartment at a relatively low predetermined temperature and automaticaly maintained at this predetermined temperature.

On a cold day, however, it is necessary to supply the heat exchanger with an increased amount of hot water to elevate the temperature of the outside air passing over the heat exchanger. Accordingly, the valve member must be initially opened over a much wider increment of its total stroke in order for air to be supplied to the passenger compartment at a higher predetermined temperature. Thus, the operating temperature range or heat range of the valve can be predetermined by selectively varying the initial open position of the valve member. After the predetermined heat range has been selected, the thermostatically controlled fluid valve will automatically maintain the air entering the passenger compartment at the selected predetermined temperature.

To insure accuracy of performance of the thermostatically controlled valve, it also becomes necessary to provide the valve with a calibration means, that is, a means to insure the movement of the valve member to the closed position when the air supplied to the passenger compartment acquires a predetermined temperature. With the valve properly calibrated, in no event will the air supplied to the passenger compartment exceed this predetermined temperature.

Heretofore, in order to provide an automatically controlled fluid valve with an adjustable heat range, it has been common practice to operatively connect the valve member to a fixed-pivot lever that moves the valve member between the open and closed positions upon rotation of the lever. Rotation of the lever in opposite directions was produced by a thermostatic element in combination with a spring, both the thermostatic element and the spring being operatively connected to the lever. The spring and thermostatic element were so positioned with respect to the valve member control lever that the force of the spring exerted on the lever was in opposition to the force exerted by the thermostatic element, the stronger force tending to rotate the lever and move the valve member to its controlling positions. Using this arrangement of components, the heat range of the valve was selectively controlled by providing a means to selectively vary the force of the spring.

Known prior art devices of this type, however, were endowed with certain structural disadvantages and objectional functional features. One of the structural disadvantages inherent in prior art devices was the necessity of using a second spring in the valve assembly. This second spring was either mounted on the control lever to bias the valve member control lever into engagement with a stem connected to the valve member or mounted coaxially with the valve stem to bias the valve member toward the open or closed position.

One of the functional disadvantages of prior art constructions resulted from the use of a fixed-pivot valve member control lever. The use of the fixed-pivot lever produced undue valve wear because of binding and improper seating of the valve member. This arose from the fact that the force producing the movement of the valve member was not applied substantially along the axis of travel of the valve member.

Another common objectionable feature of prior art devices resided in the fact that the thermostatic elements were not provided with an effective and easily adjustable calibration means. It is self evident that the absence of an effective calibration means would produce inaccuracy in the performance of the valve.

To eliminate the disadvantages inherent in prior art constructions, the present invention eliminates the fixed-pivot valve member control lever by mounting the control lever on a single-throw crank. By rotating the crank, the control lever can be shifted to a plurality of controlling positions to selectively change the heat range of the valve. The present invention also improves on the prior art by the use of only a single spring to provide a plurality of functions. The single spring biases the valve member control lever into engagement with the stem of the valve member, urges the valve member toward the open position and rotates the valve member control lever into contact with the thermostatic element. Another significant improvement in the present invention resides in the formation of a novel calibration means in combination with the valve member control lever, the calibration means being struck from the body of the lever.

Therefore, the primary object of the present invention is the construction of a thermostatically controlled fluid valve having an adjustable heat range.

Another object of the present invention is to utilize a shiftable-pivot valve member control lever in a thermostatically controlled fluid valve.

Another object of the present invention is to effect movement of the valve member control lever through the instrumentality of a crank, the control lever being mounted on the crank for movement therewith and rotation thereabout.

Another object of the invention is to use only a single spring in a thermostatically controlled fluid valve to provide a plurality of functions.

Another object of the invention is to calibrate a thermostatically controlled fluid valve with a portion of the body of the valve member control lever.

Other objects and advantages of the invention will become apparent from the following description taken in connection with the accompanying drawing wherein:

Figure 1 is a side elevation including the control cable and sensing element;

Figure 2 is a longitudinal section through the device shown by Figure 1 and being rotated 180°;

Figure 3 is a section taken on line III—III of Figure 2;

Figure 4 is a section taken on line IV—IV of Figure 2; and

Figure 5 is an end view of a portion of the mechanism showing another embodiment.

While this invention is particularly adapted for use in combination with an automotive vehicle heating system, it is to be understood that the invention is not to be limited to this particular environmental application since the invention is capable of any application where it is desirable to use a thermostatically controlled fluid valve provided with an adjustable heat range.

Referring more particularly to the drawing, the preferred embodiment shown in Figures 1 to 4, inclusive, comprises a supporting or mounting plate 1 having a plurality of apertures 1a extending therethrough. The plurality of apertures 1a are provided for the reception of holding means, such as bolts or the like, whereby the thermostatically controlled valve may be rigidly secured in any desired position of use. A tubular valve housing 2 is carried by the underside of plate 1 and a U-shaped frame member 3 is mounted on the upper surface of plate 1.

A tubular inlet conduit 4 extends through a wall of housing 2 and is secured thereto by any suitable means, such as brazing or welding. A welding or brazing fillet 4a is shown in Figure 2. The valve housing is reduced in diameter at 5 to provide an outlet.

Disposed within the interior of valve housing 2 is an apertured annular valve seat 6. Valve seat 6 is secured to the inner wall of the casing 2 by any suitable means, preferably welding or brazing, a fillet being shown at 6a.

A valve member generally designated at 7 is also disposed within casing 2 and is adapted to move within the casing between a plurality of controlling positions. The valve member 7 comprises a disc 8 carried by a centrally located body member 9 surrounded by an annular resilient seal 10. The annular seal 10 is connected to the disc 8 and body member 9 by any suitable means and engages the valve seat 6 when the valve member 7 is moved to the closed position, the peripheral surface of the seal 10 also functioning as a guide for the valve member 7 as the seal 10 moves upwardly and downwardly through the apertured valve seat 6.

The valve member 7 is carried by a valve stem 11 having a spherical head 11a on one end thereof. Adjacent the upper end thereof, the valve stem 11 is provided with a relatively large annular recess 12 and a small annular recess 13. Near the upper end thereof, the valve stem 11 is, also, provided with a reduced diameter portion 14 adjoining a spherical head 15 formed on the upper end of the stem.

The casing member 2 is adapted to be carried by a concentrically reduced circular plate generally designated at 16. One of the concentric reductions in plate 16 defines a cylindrical wall 17 which is adapted to closely fit within the inner bore of casing 2. The casing 2 is secured to the plate 16 by any suitable means, preferably welding or brazing, a fillet being shown at 17a. Another of the cylindrical reductions in plate 16 defines an outer cylindrical wall 18 the end face of which abuts the underside of plate 1 and which is secured thereto by any suitable means. Plate 16 is also provided with a centrally disposed aperture 19 therein to accommodate the movement therethrough of valve stem 11.

A seal generally designated by the reference numeral 20 surrounds the upper portion of the valve stem 11. The seal 20 comprises a bead portion 21 which is anchored in the space between the wall 18 of plate 16 and the bottom surface of mounting plate 1. Integrally formed with bead portion 21 is a web portion 22 which terminates in an annular central portion 23 surrounding the upper portion of stem 11. An annular ring 24 tightly engages the periphery of portion 23 of the seal 20 and produces an annular inwardly deflected portion 25 of the seal 20 which tightly anchors the seal to valve stem 11, the annular deflected portion 25 being seated within the annular recess 12 in the stem. Surrounding the portion 23 of the seal 20 and engaging the periphery of ring member 24 is a generally cup-shaped annular member 26 adapted to shield the exposed upper end of the seal 20. Cup-shaped member 26 is provided with an aperture 27 therein, the aperture 27 being slightly larger in diameter than the diameter of stem 11.

The cup-shaped member 26, the seal 20 and the valve stem 11 are held in the assembled position by means of a resilient clip 28 adapted to seat in the annular recess 13 in the stem 11. In assembling these components, member 26 is slipped over the spherical head of the stem 11 and then pushed axially along stem 11 to produce a slight compression in portion 23. In this compressed state of the seal 20, clip 28 is inserted into recess 13 to anchor member 26 in its protective position.

Mounting plate 1 is provided with an opening 29 therein through which the upper portion of the stem 11 and the components attached thereto may reciprocate as the valve member 7 moves between its controlling positions. It will also be noted that the web portion 22 of the seal 20 is constantly flexed as the valve member 7 moves toward the open position.

The frame member 3 is comprised of a ceiling portion 30 and a pair of opposed wall members 31 and 32. Extending between the wall members and carried thereby is a crank member 33 having a single-throw 34 formed intermediate the ends thereof. One end 35 of crank 33 projects through a circular aperture (not shown) in frame wall 32 to be rotatably journaled therein. In the opposite wall 31, the crank 33 projects through an elongated aperture 37 to be slidably and rotatably journaled therein. Adjacent the point of projection through aperture 37, the crank 33 is formed with a right-angular bent portion 36 which terminates in a small tang 38 bent approximately at a right-angle to the axis of bent portion 36.

Adapted to be controlled by crank 33 is a valve member control lever generally designated by the reference numeral 39. Control lever 39 is channel shaped in cross section including a bottom or floor portion 42 and a pair of opposed walls 40 and 41. Intermediate the ends thereof, valve lever 39 is provided with a pair of U-shaped notches 43 extending upwardly into the wall portions 40 and 41. The U-shaped notches 43 provide a means for journaling the control lever 39 on the crank 33, the lever 39 thereby being pivotally attached to the crank 33 for a combination of translatory and rotary motion therewith.

Intermediate the ends thereof, the lever 39 is also provided with an open space or void 44 in the floor portion 42 thereof, the purpose of the void to be hereinafter explained. As shown in Fig. 2, the left end of the lever 39 is provided with a recessed portion 45 in the floor thereof, the recessed portion serving as a seat for the spherical upper end 15 of the valve stem 11. Lever 39 is, also, formed with another void 44a in the floor portion 42 thereof, the voil 44a providing a strip 46 of floor portion at the right end of the lever 39 as best shown in Figs. 2 and 4.

Disposed above a lever floor strip 46 in the ceiling 30 of frame member 3 is a thermostatic element generally designated by the reference numeral 47. The thermostatic element 47 comprises a body member 48 which houses the stem of a reciprocable piston 49 which moves into and out of body portion 48 in response to changes in a temperature condition. The thermostatic element 47 is provided with an upper cylindrical portion 50 into which projects one end of a capillary tube 51. The capillary 51 contains a liquid which changes in volume upon a change in a temperature condition and thus imparts movement to piston 49 to effect rotation of the valve control lever 39. Inasmuch as thermostatic elements of this type are well known in the art, further discussion concerning the structure and function thereof is deemed unnecessary.

Portion 48 of the thermostatic element 47 is adapted to project downwardly through an aperture 52 in frame roof 30, aperture 52 being position so that the piston 49 of the thermostatic element will be in alignment with the control lever floor strip 46. The alignment of piston 49 and strip 46 permits a calibration means to be formed integral with the control lever 39. The calibration means is formed by bending strip 46 arcuately upward out of the plane of floor portion 42 as best shown in Fig. 4, arcuately bent strip 46 engaging piston 49. Thus, it can readily be seen that the valve can quickly and accurately be calibrated by merely bending strip 46 to the proper dimensions or configurations.

The upper portion 50 of the thermostatic element is housed within a substantially U-shaped housing 53 attached to the outer surface of frame roof 30 by any suitable means, the attachment means not being shown. The roof portion 54 of housing 53 is provided with a longitudinal recess 55 integrally formed therein. The recess 55 provides a seat for the thermostatic element capillary 51 and prevents the capillary from being broken off adjacent its connection with portion 50 of the thermostatic element. Housing 53 is also provided with an integral arm 56 extending substantially at a right-angle therefrom. Arm 56 is also provided with a longitudinal recess 57 integrally formed therein. Adapted to cooperate with arm 56 is a clamp member 58 also provided with a longitudinal recess 59 integrally formed therein, the recess 59 adapted to register with the recess 57. The clamp 58 is suitably attached to the arm 56 by a screw 60. As best shown in Figs. 2 and 4, the clamp 58 and the recesses 57 and 59 are adapted to retain the sheath 86 of a control cable 85 hereinafter mentioned.

Intermediate its ends, lever 39 is provided with a pair of ears 62, 63 struck from the body portion of the lever and extending transversely of the lever into the void 44 in the plane of the lever floor. The ears 62, 63 are adapted to pivotally support a substantially S-shaped force transmitting link generally designated by the reference numeral 67. Intermediate its ends, the link 67 is provided with a flat portion 68 which is adapted to engage the two ears, the two ears pivotally supporting the link at the approximate mid-point of the link. It will also be noticed, as best shown in Fig. 2, that the right half of link 67 is positioned in the void 44 in the control lever floor.

As best shown in Fig. 3, the left end of the link 67 is provided with a V-shaped notch 69 terminating in a circular aperture 70, the notch 69 and aperture 70 being shown in dotted lines. The walls of the aperture 70 are adapted to engage the lower surface of the spherical end 15 of the valve stem 11 and thus provide a connection between the valve member control lever 39 and the valve stem 11. The V-shaped notch 69 enables the reduced diameter portion 14 of the stem 11 to pass freely into the circular aperture 70.

Adjacent its other end, link 67 is provided with a recessed portion 71 forming a spring seat 72 adapted to receive one end of a compression spring 73. The opposite end of spring 73 engages a recess 74 formed in the ceiling 30 of frame member 3 to provide a spring seat 75. Thus, from the foregoing, it can readily be seen that compression spring 73 not only biases the link 67 into engagement with the valve stem and biases the valve member 7 toward the open position but, also, rotates the control lever 39 in a counterclockwise direction into engagement with the thermostatic element 47 and holds the several components in the assembled position.

As best shown in Figs. 1 and 3, a cam lever 76 is pivotally attached to wall 31 of frame member 3. One end of cam lever 76 is provided with a substantially boot-shaped cam 77 which operatively engages the tang 38 formed on one end of crank 33. Cam lever 76 is attached to wall 31 by a pin 78 with a washer 79 being disposed between the flattened head 80 of the pin and the outer surface of the lever. An annular spacer member 81 is, also, positioned between cam lever 76 and wall 31.

Intermediate the ends thereof, cam lever 76 is provided with an ear 82 struck from the body of the lever and extending substantially transversely thereof. The cam lever 76 is also provided with a transversely extending lug 83 at one edge thereof and a transversely extending lug 89 at the end opposite the cam foot. As best shown in Fig. 3, the projecting ear 82 on cam lever 76 is adapted to engage a pair of spaced transversely extending ears 84 and 84a struck from the body portion of wall 31. The ears 84 and 84a are adapted to cooperate with cam lever ear 82 to form a pair of stops and, thus, limit the rotary movement of cam lever 76 in the counterclockwise and clockwise directions of rotation respectively, as viewed in Fig. 1.

A control cable 85 extending through a sheath 86 has one end attached to lug 89 at the upper end of cam lever 76. The opposite end of control cable 85 preferably extends to the dashboard in the passenger compartment of the vehicle (not shown) and has a knob 87 attached thereto. A tension spring 88 having one end anchored in a hole 1b (Fig. 3) in mounting plate 1 and the opposite end anchored on cam lever lug 83 constantly biases cam lever 76 in a clockwise direction. The use of tension spring 88 prevents buckling of the control cable 85 when it becomes necessary to move cam lever 76 in a clockwise direction.

While one end of the capillary 51 projects into the thermostatic element 47, the opposite end terminates in a temperature sensing bulb 90 which is positioned adjacent the discharge side of the heat exchanger (not shown) in the stream of heated air entering the passenger compartment.

*Operation*

Referring to Fig. 1, the valve member 7 is shown in the closed position whereby it completely obstructs the flow of fluid to the heat exchanger. It will also be noted that, with the valve member in this position, the cam lever 76 has been rotated clockwise to such a degree that the valve member 7 will remain permanently closed. In this position of cam lever 76, the crank 33 has been rotated to elevate the control lever 39 to its uppermost position whereby further expansion of the thermostatic element will merely serve to rotate the control lever 39 in a clockwise direction and, thus, move the valve member 7 into tighter engagement with its seat.

However, in order for the valve member 7 to be moved to the closed position when the cam lever 76 is rotated to the position shown in Fig. 1, it is necessary that the calibration strip 46 be bent to the proper position. Furthermore, the calibration strip 46 must be bent to the proper position when the thermostatic element piston 49 is in an extended position corresponding to a predetermined temperature sensed by the bulb 90 of the capillary. This predetermined temperature is usually selected as the maximum temperature of the air supplied by the heat exchanger to the vehicle passenger compartment.

Therefore, to properly calibrate the operation of the thermostatically controlled valve, the bulb 90 of the capillary is first exposed to a maximum predetermined temperature to extend the piston 49. The cam lever 76 as viewed in Fig. 1 is then rotated a maximum distance counterclockwise to locate the position of crank throw 34. With the crank throw 34 or the axis of rotation of control lever 39 now in its lowermost position, the calibration strip is bent upwardly into engagement with the bottom surface of the piston, as best and clearly illustrated in Fig. 4, until it effects sufficient rotation of the control lever 39 to move the valve member 7 into engagement with its seat 6.

As distinguished from the disclosure of Fig. 1, assume it is desired to open the valve member and supply heat to the vehicle passenger compartment. If the atmospheric temperature is relatively warm, for example, about 55° F., it will be necessary to supply only a limited amount of hot water to the heat exchanger to elevate the temperature of the outside air supplied to the passenger compartment. Accordingly, the control cable 85 is pulled to rotate the cam lever a short distance in a counterclockwise direction, as viewed in Fig. 1. Movement of cam lever 76 imparts rotation to crank 33 and, thereby, shifts the position of the control lever 39, control lever 39 moving downwardly and being rotated counterclockwise by the force of spring 73. Since the control lever 39 engages the spherical upper end 15 of the valve stem 11, the counterclockwise rotation of the control lever 39 is accompanied by a corresponding downward movement of the valve stem 11 moving the valve member 7 a small increment of its total stroke and out of engagement with its seat 6.

It will be noted that the counterclockwise rotation of the control lever 39, also, moves the calibration strip into contact with the thermostatic element piston 49, thereby eliminating any lost motion of the piston in the event of an increase in temperature. It might also be added that due to the force of spring 73, the calibration strip 46 is constantly urged into contact with the thermostatic element piston 49 in all positions of the control lever 39 except when the crank throw 34 is in its lowermost position or when the cam lever 76 is in its maximum counterclockwise position as seen in Fig. 1.

If the temperature of the air entering the passenger compartment should increase after the valve member 7 has been initially opened over a small increment of its total stroke, the fluid in capillary 51 will expand and piston 49 will move downwardly and rotate the control lever 39 in a clockwise direction, moving the valve member 7 toward engagement with its seat and thereby reducing the flow of fluid to the heat exchanger. Thus, the air is supplied to the passenger compartment at a pre-selected temperature and automatically controlled to maintain this pre-selected temperature.

On the other hand, when the atmospheric temperature is relatively low, for instance, about 30° F., it becomes necessary to supply a much larger volume of hot water to the heat exchanger to elevate the temperature of the air entering the passenger compartment. In this situation, cam lever 76 is rotated counterclockwise a much farther distance and the valve member 7 is open over a much larger increment of its total stroke. Crank 33 is also rotated to a lower position to thereby lower the pivot point of the control lever 39. Thus, with the cam lever 76 in this position, the air will be supplied to the passenger compartment at a much higher pre-determined temperature and will be automatically controlled to maintain this higher pre-determined temperature.

The present invention, therefore, enables the occupant of the passenger compartment of a vehicle to select the heat range of the valve compatible with the atmospheric temperature by merely pushing or pulling the control cable 85 to vary the position of cam lever 76. When the position of the lever has been changed, the valve will automatically maintain the temperature of the air entering the passenger compartment within the desired temperature range.

Fig. 5 shows another embodiment of the supporting means for the S-shaped force transmitting link 67. Instead of being supported on a pair of ears, link 67 is carried by a substantially U-shaped yoke member 91 having right angular bent portions 92 and 93 on the free ends thereof. Bent portions 92 and 93 are anchored in a pair of slots (not shown) on the upper edges of control lever wall sections 40 and 41 respectively. The bottom or connecting portion of the U-shaped member 91 extends between the control lever wall sections 40 and 41 and pivotally supports the S-shaped link 67 at the approximate mid-point of the link, at about the same point the link is supported by the ears in the first embodiment of the supporting means.

While only two embodiments of the present invention have been shown and described herein, it will be apparent that various changes may be made in the form and arrangement of parts and the details of construction herein disclosed without departing from the scope of the invention as defined in the appended claims.

It is claimed and desired to secure by Letters Patent:

1. A thermostatically controlled fluid valve comprising housing means, a casing carried by said housing means having an inlet and an outlet for fluid therein intersected by a valve seat, a valve member in said casing movable between open and closed positions relative to said valve seat for controlling the flow of fluid through said casing, a stem carried by said valve member, a rotatable crank carried by said housing means and provided with a throw intermediate the ends thereof within said housing means, a control lever rotatably mounted on said crank throw, link means rotatably supported by said control lever and being connected to said valve stem, resilient means engageable with said link means and being operable to resiliently connect said control lever and said valve stem and to rotate said control lever in one direction in response to changes in a temperature condition to move said valve member away from said seat, thermally responsive means cooperable with said control lever for rotating said control lever in the opposite direction in response to changes in a temperature condition and thereby moving said valve member toward engagement with said seat, and cam means having a cam surface cooperable with said crank for rotating same to vary the position of said throw to thereby translate the position of said control lever relatively to said thermally responsive means.

2. A thermostatically controlled fluid valve as claimed in claim 1 wherein said resilient means is comprised of a single spring having one end acting on said link means and the opposite end thereof acting on said housing means.

3. A thermostatically controlled fluid valve as claimed in claim 1 wherein said link means is comprised of a single, substantially S-shaped link, said link being rotatably supported intermediate its ends on a pair of ears projecting from said control lever.

4. A thermostatically controlled fluid valve as claimed in claim 1 wherein said link means is comprised of a single, substantially S-shaped link, said link being rotatably supported intermediate its ends by a substantially U-shaped yoke member carried by said control lever.

5. A thermostatically controlled fluid valve comprising housing means, a casing carried by said housing means having an inlet and an outlet for fluid therein intersected by a valve seat, a valve member in said casing movable between open and closed positions relative to said seat for controlling the flow of fluid through said casing, a stem carried by said valve member, a rotatable crank carried by said housing means and provided with a throw intermediate the ends thereof within said housing means, a control lever rotatably mounted on said crank throw, link means rotatably supported by said control lever and being connected to said valve stem, resilient means engageable with said link means and being operable to resiliently connect said control lever and said valve stem and to rotate said control lever in one direction in response to changes in the temperature condition to move said valve member away from said seat, thermally responsive means cooperable with said control lever for rotating said control lever in the opposite direction in response to changes in a temperature condition to move said valve member toward engagement with said seat, lever means rotatably carried by said housing means, and cam means carried by said lever means and provided with a cam surface thereon cooperable with said crank, said cam means being operable upon rotation of said lever means to rotate said crank and said throw to thereby translate the position of said control lever relative to said thermally responsive means.

6. A thermostatically controlled fluid valve comprising a support member, a casing carried by said support member and provided with an inlet and an outlet for fluid therein intersected by a valve seat, a valve member in said casing movable between open and closed positions relative to said seat for controlling the flow of fluid through said casing, a stem carried by said valve member, housing means carried by said support member, a rotatable crank carried by said housing means and provided with a throw intermediate the ends thereof within said housing means, a control lever rotatably mounted on said crank throw, calibration means integral with said control lever, link means rotatably supported by said control lever and being connected to said valve stem, resilient means engageable with said link means and being operable to resiliently connect said control lever and said valve stem and to rotate said control lever in one direction in response to changes in a temperature condition to move said valve member away from said seat, thermally responsive means cooperable with said control lever for rotating said control lever in the opposite direction in response to changes in a temperature condition to move said valve member toward engagement with said seat, lever means rotatably carried by said housing means, cam means carried by said lever means and provided with a cam surface thereon cooperable with said crank, said cam means being operable upon rotation of said lever means to rotate said crank and said throw to thereby translate the position of said control lever relative to said thermally responsive means, means biasing said lever means in one direction of rotation, and manually operable means connected to said lever means for rotating said lever means in the opposite direction of rotation.

7. A thermostatically controlled fluid valve as claimed in claim 6 wherein said calibration means comprises a deformation of a portion of said control lever, said deformation capable of being varied to produce the correct calibration adjustment.

References Cited in the file of this patent

UNITED STATES PATENTS

| | | |
|---|---|---|
| 1,376,462 | Robertshaw | May 3, 1921 |
| 2,575,081 | Watkins | Nov. 13, 1951 |
| 2,663,499 | Schutt | Dec. 22, 1953 |